United States Patent Office

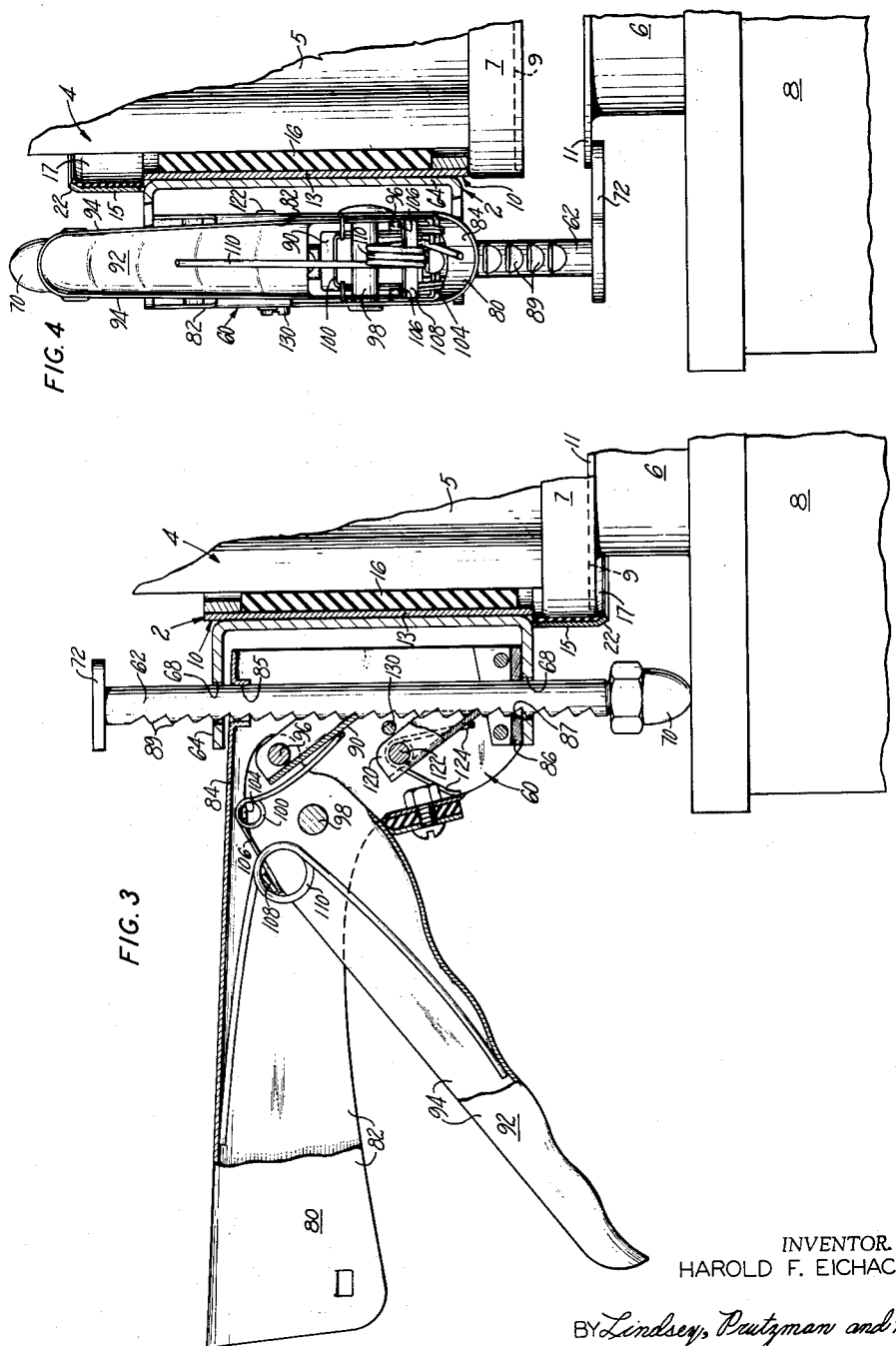

3,197,848
Patented Aug. 3, 1965

3,197,848
TOOL FOR ELECTRIC METERS
Harold F. Eichacker, 23 Churchill Road,
Wethersfield, Conn.
Filed Oct. 25, 1963, Ser. No. 318,953
10 Claims. (Cl. 29—203)

This invention relates to tools particularly suitable in connection with the installation and removal of electric meters.

One of the principal objects of the present invention is to provide a new and improved tool which is operable with a minimum of manual effort and skill and which is conveniently useful for installing and removing electric meters even though they are installed in hard-to-reach locations.

Another object of the present invention is to provide a meter tool that can be safely and readily operated without subjecting the operator to possible injury even where the typical glass dome of the meter is broken. Included in this object is the provision of a meter tool which in use enables the operator to avoid direct contact with the meter and which permits him to operate the tool safely under such hazardous conditions.

A still further object of the present invention is to provide a meter tool that may be effectively utilized to remove or install heavy duty meters.

A still further object of the present invention is to provide a meter tool that incorporates a novel jack for installing the meter on or removing it from an associated socket.

A still further object of the present invention is to provide a meter tool having a rugged and economical construction giving dependable service over a long life span.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawings:

FIG. 3 is an enlarged side view, partly broken away and partly in section, of a portion of the installation of FIG. 1; and FIG. 4 is an enlarged side view similar to FIG. 3 with the tool in a reverse position on the meter.

Figure 1:
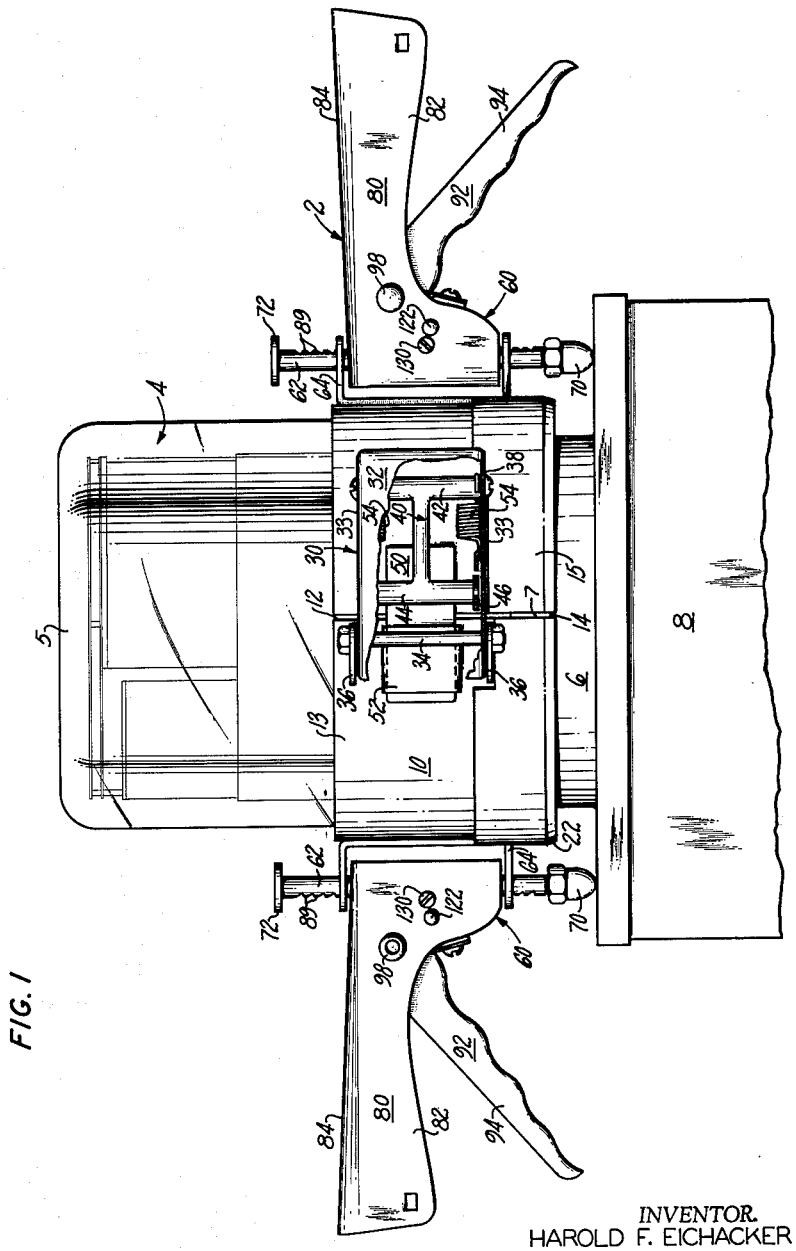
FIG. 1 is a side view, partly broken away, of an embodiment of a meter tool of the present invention installed on a meter for removing the same from an associated socket.

Referring to the drawings in detail, a tool embodying the present invention, generally designated by the numeral 2, is illustrated in FIG. 1 installed on an electric meter 4 mounted in a usual manner on a socket 6 of a typical meter supporting base or outlet box 8. The meter 4 is shown to be of conventional type and includes a generally cylindrical glass dome or cover 5 secured to a ring or base 7. The base is provided with a recess 9 for receiving an annular flange 11 of the socket 6 when the meter is fully installed on the socket, as shown in FIG. 1. In this installed position the meter is conventionally secured to the supporting base 8 by a band (not shown) adapted for attaching the meter ring 7 to the flange 11.

In the illustrated embodiment, the tool 2 comprises a generally cylindrical C-shaped holder or jacket 10 dimensioned to receive the meter 4 and which includes a primary tubular casing 13 and a secondary tubular casing 15 welded thereto. Both of the casings 13, 15 are circumferentially discontinuous whereby a pair of spaced edges 12, 14 thereof can be moved toward each other to contract the holder from an expanded configuration onto the meter dome and thereby clamp the meter in the holder, it being preferred that the casings 13, 15 have a lateral resiliency with an undeformed expanded configuration for loosely receiving the meter dome.

The holder 10 is adapted to receive the meter dome 5 through either end thereof depending on whether the meter is to be installed or removed. In removing the meter from its outlet box 8, the dome 5 of the meter as well as the base 7 thereof are preferably engaged by the holder as shown in FIG. 3, and when installing the meter the holder 10 is reversely mounted on the meter dome, preferably as shown in FIG. 4 with an end of the holder in engagement with the meter base 7.

In order to provide an effective clamp on the meter dome 5 without damaging it, a resilient liner 16 of a suitable material having a high coefficient of friction such as rubber is bonded to the internal surface of the holder casing 13. The liner 16 has a width sufficient for firmly gripping the meter dome 5 above the meter base 7; however, the secondary casing 15, in the preferred manner of using the tool for removing a meter, receives the base 7 of the meter, for which purpose a second rubber liner 17 may be provided on the internal surface of the casing 15 to increase the frictional engagement with the meter while at the same time protecting the meter base 7 against damage.

The typical contacts (not shown) of the socket 6 which receive the terminals (not shown) of the meter often require a considerable force to be applied to the meter in order to remove it from or install it on the socket. For this reason, the secondary casing 15 of the holder 10 is preferably provided with an inwardly extending annular lip 22 which is adapted to catch the edge of the meter base 7 when the holder is contracted onto the dome, as shown in FIG. 3, to thereby supplement the frictional clamp on the meter and thus assist in removing the meter from the socket. However, with the holder in its expanded configuration for installing the holder on or removing it from the dome, the lip 22 is adapted to pass freely around the base 7.

Figure 2:
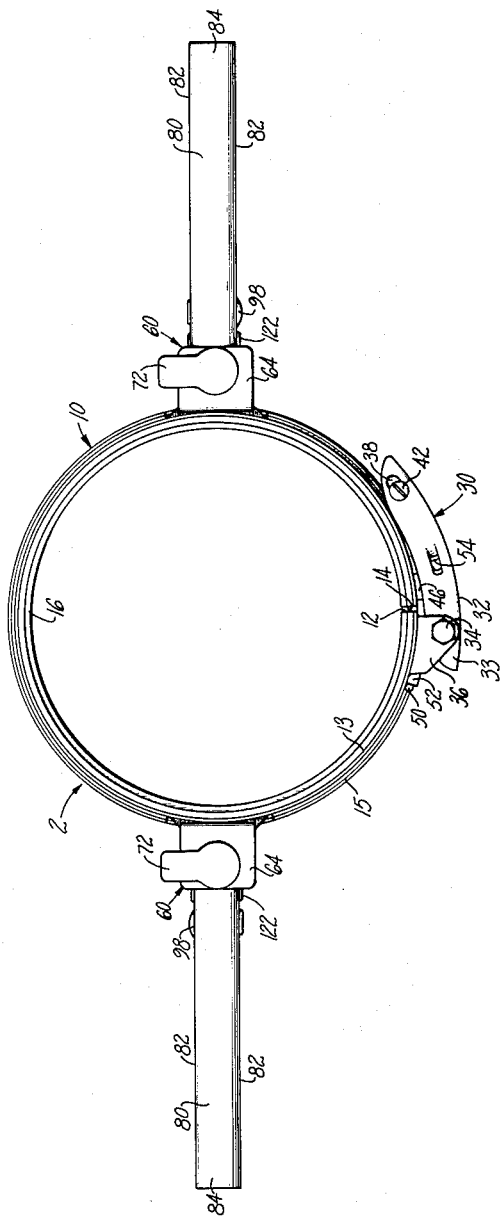
FIG. 2 is a longitudinal end view of the tool.

In order to contract the holder and thereby secure it to the meter, an overcenter latch, generally designated by the numeral 30, is mounted between the ends 12, 14 of the C-shaped primary casing 13. In the illustrated embodiment the latch 30 includes a lever 32 of generally U-shaped cross section with inturned side walls 33. One end of the lever is pivotally mounted to the holder casing 13 adjacent its edge 12 by a pivot pin 34 received through apertures in side walls 33 of the lever 32 and suitably mounted to a pair of apertured ears 36 fixed to the casing. At the opposite end of the lever in the side walls 33 there are provided a pair of opposed elongated slots 38 (FIG. 2) for slideably receiving the ends of a pivot pin 42 of a connecting element 40 illustrated as having a generally H shape. A second pivot pin 44 of the connecting element 40 is pivotally connected to the casing 13 adjacent the edge 14 thereof by a second pair of apertured mounting ears 46 fixed to the holder between the lever side walls 33. An overcenter bias is provided for resiliently retaining the lever in both its open and closed positions and includes a pair of tension springs 54 having one end fixed to the pivot pin 42 of the connecting element 40 and the other end anchored to the lever 32.

Thus, by pivoting the lever 32 inwardly to its fully closed position the holder 10 can be contracted for clamping the meter and by pivoting the lever 32 outwardly the holder is free to expand for releasing the meter. This opening and closing movement of the holder 10 is shown guided by an arcuate tongue 50 fixed to the casing 13 adjacent the edge 14 and extending circumferentially beyond the opposite edge 12 thereof to a guideway provided by a U-shaped piece 52.

In accordance with an aspect of the present invention, a pair of jacks 60 are fixed to the holder casing 13 for installing or removing the meter. The jacks 60 are preferably diametrically positioned on the holder and include an elongated jack rod 62 extending parallel to the holder axis. The jack rod is mounted in aligned mounting holes 68 of a U-shaped bracket 64 fixed to the casing 13 for longitudinal and rotatable movement relative to the holder. The forward end of each jack rod 62 is threaded to receive a cap 70 and the rear end of each jack rod has a transverse flat shoe 72 fixed thereto. The caps 70 are adapted to engage the outlet box 8 during removal of the meter, as shown in FIG. 1, while the shoes 72 are adapted for use in installing the meter, as shown in FIG. 4.

Each jack 60 has a manual control handle 80 pivotally mounted on the jack rod 62 for movement about the axis of the jack rod. In the shown embodiment, the handle 80 has a pair of spaced side walls 82 that are joined by top and bottom walls 84, 86 which are provided with apertures 85, 87 for receiving the jack rod. The jack rod 62 can be manually advanced relative to the holder 10 by a ratchet mechanism which includes an elongated ratchet edge on the jack rod with teeth 89 and a ratchet or advancing pawl 90. The ratchet pawl 90 is actuated by an operating lever or grip 92 having a pair of spaced side walls 94 to which the ratchet pawl 90 is pivotally mounted by a pivot pin 96. The operating lever 92 is, in turn, pivotally mounted between the side walls 82 of the handle 80 by a pivot pin 98.

A torsion spring 100 is provided for biasing the ratchet pawl, counterclockwise as viewed in FIG. 3, into engagement with the ratchet edge of the jack rod 62. The spring 100 encircles inwardly extending tabs 104 of the lever 92 and has a pair of legs 106 which engage a cross piece 108 inwardly extending from the side walls 94 of the lever 92 and a flange portion of the ratchet pawl 90. A second torsion spring 110 is provided for extending the operating lever 92 after it has been manually depressed toward the handle 80. The spring 110 encircles the cross piece 108 and has a pair of legs which engage the outer walls of the handle 80 and grip 94 whereby the operating lever 92 is continuously biased to an open or extended position.

A locking pawl 120 is provided for retaining the jack rod 62 against withdrawal. The locking pawl 120 is pivotally mounted to the side walls 82 of the handle 80 by a pivot pin 122 and is biased into engagement with the ratchet edge of the jack rod 62 by means of a generally U-shaped torsion spring 124 which encircles the pivot pin 122 and which engages the locking pawl 120 and a wall portion of the handle 80.

Each jack is provided with a stop pin 130 for selectively rotating the jack rod 62 in its supporting bracket 64 in unison with pivotal movement of the handle 80 and thereby facilitate positioning the shoe 72 while maintaining the jack rod in operative association with the ratchet mechanism, it being understood that by rotating the jack rod approximately 90° with respect to the handle 80 the jack rod can be released for subsequent longitudinal displacement in either longitudinal direction. The stop pin 130 is fixed to the side walls 82 of the handle 80 adjacent the teeth 89 of the jack rod such that the ratchet pawl 90 may be wedged between the stop pin 130 and the adjacent teeth 89 of the jack rod by fully depressing the grip 92.

For removing a meter from an associated supporting box, the latch 30 is released and the holder is mounted onto the meter 4 by initially passing the forward end of the holder over the meter, preferably until the lip 22 on the secondary casing 15 of the holder is positioned just beyond the end of the meter base 7. The latch lever 32 is then actuated to securely clamp the meter in the holder with the resilient rubber liner 16 firmly engaging the dome of the meter, the liner 17 engaging the base 7 of the meter and with the lip 22 of the holder engaging the edge of the meter base, all as shown in FIG. 3. With the jack rods rotatably aligned for actuation by the ratchet mechanism, the jack rods 62 are advanced by the operating lever 92 until the jack rod caps 70 engage the outlet box 8, as shown in FIG. 3, whereupon continued actuation of the operating lever 92 will effect withdrawal of the holder 10 and therefore withdrawal of the meter 4 from the socket 6, it being understood that longitudinal movement of the jack rods 62 during the withdrawal of the meter is prevented by the outlet box or by some other supporting member adjacent the socket. After the terminals of the meter 4 have been fully withdrawn from the socket, the meter may be carried with the handle 80 if desired and thereafter conveniently released by actuating the latch lever 32.

For installing the meter, the holder 10 is secured onto the meter in a reverse position with the jack rod shoes adjacent the socket 6 and preferebaly with the rear edge of the casing 13 in engagement with the base 7. The jack rods 62 are longitudinally withdrawn by first rotating the jack rods to disengage the teeth 89 from the pawls 90, 120 and after being withdrawn the jack rods are rotated to reengage their teeth 89 with the pawls. The meter is then positioned in alignment with the socket 6 and the handles 80 are pivoted, with the operating lever 92 being fully depressed to lock the jack rods for common rotation with the handles, for disposing the shoes 72 beneath the flange 11 of the socket. In the illustrated embodiment, this orientation of the tool handles may be accomplished by rotating the control handles 80 substantially 90° from their positions shown in FIG. 2.

Having properly positioned the meter and holder, the operating levers 92 are actuated to draw the shoes 72 against the flange, as shown in FIG. 4, whereupon continued actuation of the operating lever 92 will operate to force the meter into the socket with longitudinal movement of the jack rods 62 being arrested by the flange 11. After the meter has been fully installed in the socket, as characterized by the receipt of the socket flange 11 in the recess 9 of the meter, the shoes 72 of the jack rods 62 are removed from beneath the flange 11 by rotating the handles 80 again with the operating lever 92 fully depressed.

From the above it will be appreciated that for both installing and removing a meter, the forces applied to the meter are evenly distributed about its periphery. Additionally, the jacks cooperate to maintain the meter in alignment with the socket and are highly effective in removing or installing the meter without subjecting it to lateral forces tending to warp or damage the meter. Moreover the operator is not required to handle the meter during its installation or removal thereby rendering the installation or removal of the meter safe and convenient even though the glass meter dome is cracked or broken.

As will be apparent to persons skilled in the art, various modifications and adaptations of the structure above described will become readily apparent without departure from the spirit and scope of the invention, the scope of which is defined in the appended claims.

I claim:

1. A tool for installing and removing electric meters and the like with respect to an associated socket comprising a hollow open-ended holder dimensioned to receive the meter from one end for removing the meter and to receive the meter from the other end for installing the meter, said holder having means for releasably securing the meter therein; and at least one jack connected to the holder externally thereof comprising an elongated jack rod disposed parallel to the axis of the holder and mounted for longitudinal and rotational movement, said jack rod having a ratchet edge formed thereon, a jack operating mechanism including a handle mounted for pivotal movement about the jack rod axis, a ratchet pawl engageable with the ratchet edge and an actuating grip pivotally connected to the handle and operatively connected to the ratchet pawl for forwardly advancing the jack rod longitudinally of the holder, a locking pawl mounted on the handle engageable with the ratchet edge, the forward end of said jack rod being engageable with a supporting structure adjacent the socket when the tool is employed for removing the meter and the rear end of the jack rod having fixed thereto a transversely extending shoe engageable with a flange on the socket when the tool is employed for installing the meter, and stop means on the handle engageable with the ratchet pawl for retaining the ratchet pawl in engagement with the ratchet edge whereby the jack rod can be rotated by pivotal movement of the handle to operatively position the shoe.

2. A tool for installing and removing electric meters and the like with respect to an associated socket comprising a generally tubular C-shaped holder having an expanded undeformed configuration for receiving a meter dome from either end thereof, overcenter latch means for contracting the holder for securing it to the meter, a resilient liner providing an internal surface of the holder engageable with the meter dome when the holder is contracted thereabout, said holder at one end thereof defining an annulus dimensioned to accommodate an enlarged base on the meter, an elongated jack rod extending parallel to the axis of the holder, means mounting the jack rod for longitudinal movement relative to the holder, and means for longitudinally advancing the jack rod relative to the holder.

3. The tool as defined in claim 2 wherein said one end of the holder has a substantially annular inwardly extending lip engageable with the base of the meter when the holder is contracted thereon for removing the meter and thereby assist in securing the holder to the meter.

4. A tool for electric meters comprising a generally annular jacket adapted for receiving a meter dome in either of two reverse positions, means for securing the jacket against withdrawal from the meter dome; and a pair of circumferentially spaced jacks operatively connected to the jacket each having a handle, an elongated jack rod slideably mounted on the handle for movement substantially parallel to the axis of the jacket, means for advancing the jack rod forwardly including a grip pivotally mounted on the handle, and retention means adjacent the rear end of the jack rod adapted for connection to a meter base whereby with the jacket in one of two reverse positions the forward end of the jack rod is adapted to engage a meter support for removal of the meter dome and with the jacket in the other of the two reverse positions the retention means is connectible to the meter support for installation of the meter dome.

5. A tool for electric meters comprising a generally circular C-shaped jacket having an expanded configuration adapted for receiving a meter in either of two reverse positions, overcenter latching means on the jacket for contracting the jacket into operative engagement with the meter dome, and a pair of diametrically spaced jacks operatively connected to the jacket; each of said jacks comprising a handle, an elongated jack rod with an elongated ratchet edge slideably mounted on the handle for movement substantially parallel to the axis of the jacket, a jack operating mechanism including an advancing pawl engageable with the ratchet edge and a grip pivotally mounted on the handle and operatively connected to the advancing pawl for advancing the jack rod forwardly on the handle, a locking pawl mounted on the handle engageable with the ratchet edge for preventing rearward longitudinal movement of the rod, stop means on the handle engageable with the advancing pawl for retaining the advancing pawl in engagement with the ratchet edge, means mounting the handle on the jacket for pivotal movement about the jack rod axis, and a laterally extending foot fixed to adjacent the rear end of the jack rod for extension beneath a meter base flange.

6. A tool for installing and removing electric meters and like articles having a generally cylindrical dome with respect to an associated socket, comprising a holder dimensioned to receive the generally cylindrical dome having means for releasably securing the dome therein and at least one jack mounted on the holder having an elongated jack rod adapted for longitudinal movement substantially parallel to the axis of the cylindrical dome secured within the holder, and means for longitudinally advancing the jack rod relative to the holder including a manually manipulatable grip handle extending laterally of the longitudinal axis of the jack rod, said holder having means for mounting the elongated jack onto the cylindrical dome in either of two reverse positions for installing the meter onto and for removing it from its associated socket respectively.

7. A tool for installing and removing electric meters and like articles having a generally cylindrical dome with respect to an associated socket comprising a hollow open-ended generally circular holder dimensioned to receive the dome having means for releasably securing the dome therein and a pair of spaced jacks mounted on the holder; each of said jacks including an elongated jack rod mounted for longitudinal movement substantially parallel to the axis of the meter dome secured within the holder, a manual handle extending laterally of and mounted for pivotal movement about the longitudinal axis of the jack rod, and manually operable grip lever means adjacent the handle for longitudinally advancing the rod relative to the holder.

8. A tool for axially installing an article having a generally cylindrical dome onto and for removing it from an associated socket of a base member; comprising a jack having a frame, an elongated jack rod mounted for longitudinal movement in the frame, manually operable means mounted on the frame for advancing the jack rod in a forward longitudinal direction and attachment means fixed to adjacent the rear end of the jack rod for connecting the jack rod to the meter base; and means for securing the jack frame to the article in either of two reverse positions with the longitudinal axis of the jack rod substantially parallel to the axis of installation and removal of the article whereby with the jack in one of said reverse positions the forward end of the jack rod is adapted to engage the base member for removing the article from the socket upon forward longitudinal displacement of the jack rod and with the jack in the other of said reverse positions the attachment means is adapted to attach the jack rod to the base member for installing the article in the socket upon forward longitudinal displacement of the jack rod.

9. A tool for axially installing electric meters onto and for removing them from an associated socket on a meter base comprising; a jack having a frame, an elongated jack rod with an elongated ratchet edge mounted for longitudinal movement on the frame, said frame having a handle extending laterally of the axis of longitudinal movement of the jack rod, a jack operating mechanism for forwardly advancing the jack rod including an advancing pawl engageable with the ratchet edge and a laterally extending grip lever connected to the advancing pawl and pivotally mounted on the frame adjacent the handle for manual operation thereof, a locking pawl mounted on the frame engageable with the ratchet edge for preventing rearward longitudinal movement of the jack rod, and attachment means fixed to adjacent the rear end of the jack rod for connecting the jack rod to the meter base; and means for securing the jack frame in either of two reverse positions to an electric meter with the longitudinal axis of the jack rod substantially parallel to the axis of installation and removal of the electric meter whereby with the jack in one of said reverse positions the forward end of the jack rod is adapted to engage the meter base for removing the meter from the socket upon forward advancement of the jack rod and with the jack in the other of said reverse positions the attachment means is adapted to connect the jack rod to the meter base for installing the electric meter in the socket upon forward advancement of the jack rod.

10. A tool for axially installing electric meters and the like onto and for removing them from an associated socket of a meter base comprising a hollow open-ended jacket dimensioned to receive a meter from either end thereon and having means for releasably securing the meter therein; and at least one jack mounted on the jacket having an elongated jack rod extending generally parallel to the axis of installation and removal of an electric meter secured within the jacket, said jack rod being mounted on the jacket for forward longitudinal movement and for angular movement about its longitudinal axis, said jack having means for forwardly advancing the jack rod longitudinally of the holder including a handle mounted for pivotal movement about the longitudinal axis of the jack rod, the forward end of the jack rod being engageable with the meter base adjacent the socket for removal of the meter, and attachment means on the rear end of the jack rod engageable with the meter base for connecting the jack rod thereto for installation of the meter.

References Cited by the Examiner

UNITED STATES PATENTS

| | | | |
|---|---|---|---|
| 509,565 | 11/93 | Aiken | 254—108 |
| 2,306,461 | 12/42 | Miller | 29—200 |
| 2,608,750 | 9/52 | Cluzel | 29—200 X |
| 2,865,089 | 12/58 | Machian | 29—203 |
| 2,882,100 | 4/59 | Bank | 182—129 |
| 3,012,311 | 12/61 | Shupe | 29—200 |

WHITMORE A. WILTZ, *Primary Examiner.*

THOMAS H. EAGER, *Examiner.*